United States Patent [19]
Woodward

[11] Patent Number: 5,367,910
[45] Date of Patent: Nov. 29, 1994

[54] METHOD AND APPARATUS FOR MEASURING GAS FLOW USING BOYLE'S LAW

[75] Inventor: W. Stephen Woodward, Chapel Hill, N.C.

[73] Assignee: Curtin Matheson Scientific, Inc., Houston, Tex.

[21] Appl. No.: 849,859

[22] Filed: Mar. 12, 1992

[51] Int. Cl.$^5$ ............................................. G01F 1/34
[52] U.S. Cl. .................................................. 73/861
[58] Field of Search ............................. 73/199, 861

[56] References Cited

U.S. PATENT DOCUMENTS 4,285,245 8/1981 Kennedy .......................... 73/199 X
4,364,413 12/1982 Bersin ............................. 73/861 X Primary Examiner—Herbert Goldstein
Attorney, Agent, or Firm—Graham & James

[57] ABSTRACT

A gas flow meter uses the principle of Boyle's law to measure the gas flow rate along a path. Gas flows through a valve into a reservoir until the pressure is maximized in the volume. The valve then vents the reservoir to ambient while blocking the inlet path. The pressure at maximum and minimum values is measured by a pressure sensor and used to generate the flow rate signal. An enlarged volume in the inlet path limits the pressure rise during the exhaust phase of the measurement cycle.

19 Claims, 4 Drawing Sheets

METHOD AND APPARATUS FOR MEASURING GAS FLOW USING BOYLE'S LAW

BACKGROUND OF THE INVENTION

This invention relates to gas flow measuring devices. More specifically, this invention relates to gas flow measuring devices for providing electrical signals representative of gas flow.

Many techniques exist in the prior art for the electronic measurement of gas flow. Typically, such techniques require prior knowledge, of the physical properties of the gas to be measured so that the measuring instrument can be calibrated. Typical examples of such physical properties are the specific heat capacity, density, viscosity, and thermal conductivity of the gas. Many of these physical parameters are themselves dependent upon the composition of the gas. For applications in which the gas composition is unknown or variable in an unpredictable way, such techniques are both inaccurate and unsuitable.

Additional disadvantages inherent in many prior art techniques include limitations in the range of flow rates over which accurate measurements can be reliably made, sometimes termed the "turn-down ratio", and the generation of unacceptable back pressure in the gas path when the flow meter is connected and operational.

In an attempt to overcome the above-noted shortcomings of the prior art, flow meters have been developed which are less sensitive to gas physical parameters. This class of flowmeter is generally termed a positive displacement type flowmeter. In a positive displacement flowmeter, the gas whose flow is to be measured is periodically accumulated in a separate confining chamber, such as a cylinder with a tight fitting piston, whose volume increases at a rate equal to the flow of the gas (e.g., by displacement of the piston). By measuring the rate of increase of the confined volume (e.g., by generating a signal representative of the amount of displacement of the piston), the gas flow rate may be computed. While specific flowmeter details (such as the manner of defining the confined volume and the technique for transducing the rate of volume change) differ depending on the style and application of a given positive displacement flowmeter, all such flowmeters possess the desirable property of reasonable accuracy in the gas flow measurement independent of the physical parameters of the gas being measured. However, a severe disadvantage in known positive displacement flowmeters is the disturbance in the gas flow caused by the necessity of displacing the movable surface of the confining chamber in order to generate the measurement signal. This introduces back pressure characteristics which render such flowmeters unsuitable for use in any application sensitive to the periodic introduction of gas flow back pressure.

One positive displacement type gas flowmeter which has been developed to reduce the adverse back pressure effect is the soap-film type of positive displacement flowmeter. In this type of flowmeter, the confined volume is defined by a smooth-walled cylindrical tube typically fabricated from transparent glass. The tube has an inlet end connected to the gas whose flow is to be measured and an outlet end open to ambient. Adjacent the inlet end is an arrangement for introducing a soap film to be swept along the inner volume of the tube by the advancing gas flow. Optical sensors arranged at predetermined locations along the tube measure the transit time of the soap film translated along the interior of the tube, and this time value is converted to a gas flow rate using a known algorithm. Due to the fact that only the relatively small forces of viscosity and surface tension effects oppose the motion of the soap film and thus the flow of the gas stream, the back pressures generated by this type of flowmeter are generally sufficiently low to be acceptable. In addition, the soap film flowmeter has a dynamic measurement range which is substantially broader than that of other positive displacement flowmeters (typically in the range from about 0.5 to about 500 Ml/min.). Also, this type of flowmeter is relatively inexpensive to manufacture., and maintain. The major disadvantage of the soap film flowmeter is the requirement that soap film must be periodically generated, introduced into the gas stream and somehow exhausted. Generation of the soap film is typically performed by means of a manually operated bubble generating device, which requires the presence of a human operator and prevents automatic or unattended operation. Also, due to the fact that the wet film is introduced into the gas stream, the stream is contaminated with water vapor, which is unsuitable for many in-line applications involving gasses.

SUMMARY OF THE INVENTION

The invention comprises a flowmeter which requires no advance knowledge of the physical parameters of the gas, introduces no substantial back pressure in the gas flow path, introduces no contamination in the gas path, possesses a wide dynamic range of measurable flow rates, which is compatible with a wide variety of gas flow applications, and is capable of fully automatic operation.

From a method standpoint, the invention comprises a method of determining the flow rate of a gas along a path having an inlet and an outlet by directing the gas from the inlet into an enclosed volume until the gas pressure in the enclosed volume reaches a maximum value, blocking the flow of gas from the inlet to the volume and venting the gas pressure from the volume through the outlet until the gas pressure in the volume reaches minimum value, generating a signal representative of the change in gas pressure in the volume between the maximum and minimum values, and determining the gas flow rate from the generated signal. The gas flow is controlled by a valve positioned in the path between the inlet and the outlet, and the valve is operated to provide a temporary flow path from the inlet to the enclosed volume while blocking the flow path from the volume to the outlet during the first portion of a measurement cycle and to provide a temporary flow path from the volume to the outlet and blocking the flow path from the inlet to the volume during a subsequent portion of a measurement cycle. During the subsequent portion of the measurement cycle, pressure rise in the blocked path between the inlet and the volume is limited by providing an accumulator volume in that portion of the path between the inlet and the valve.

The signal generated is a signal representative of the gas pressure in the volume, and this signal is sampled to determine the maximum and minimum values. The flow rate signal is determined from the maximum and minimum values of the pressure signal using a formula derived using the principles of Boyle's law.

From an apparatus standpoint, the invention comprises a gas path having an inlet and an outlet through which a gas may flow, a first reservoir having a gas entrance, and a valve mechanism. The valve mechanism has a gas inlet port, a gas outlet port, a common port coupled to the gas entrance of the first reservoir, and a controllable element for providing gas coupling between the gas inlet port and the common port when in a first position and between the common port and the gas outlet port when a second position. The apparatus further includes means for coupling the gas inlet to the gas inlet port and means for coupling the gas outlet port to the gas outlet.

Control means coupled to the controllable valve element generates a control signal to place the controllable element in the first position for a predetermined period of time and in a second position for a predetermined period of time during a gas flow measurement cycle. The first predetermined period of time is sufficiently long to enable the enclosed volume to be filled to a maximum pressure when the controllable element is in the first position. Similarly, the second predetermined time interval is sufficiently long to enable the enclosed volume to be vented to ambient pressure when the controllable element is in the second position. In order to limit the pressure rise in the gas flow path through the apparatus when the controllable valve element is in the second position, an accumulator volume is located between the gas inlet and the gas inlet port of the valve mechanism.

A pressure sensor in communication with the enclosed volume generates a signal representative of the pressure therewithin. Processing means coupled to the pressure sensor means converts the pressure sensor signal to a gas flow rate signal. Preferably, the processing means includes a sample and hold circuit having a signal input coupled to the sensor output, a signal output for manifesting the gas flow rate signal, and a control input coupled to the control means. The processing means generates the gas flow rate signal in accordance with an equation dependent on the principles of Boyle's law and which uses the magnitude of the enclosed volume, the frequency of the measurement cycle, and the difference between the values of the maximum and the minimum gas pressure denoted by the sensor signals.

The control means includes a timing circuit for specifying a multiple phase measurement cycle, the timing circuit including a first output terminal for manifesting a control timing signal for the valve mechanism and a second output terminal for manifesting a control timing signal for the processing means.

The output of the processing means is coupled to a suitable follow-on device, such as analog display, a chart recorder, or an analog to digital converter and digital display.

The invention is based upon the principle of Boyle's law of gasses which states that, at invariant temperature, the product of pressure and volume of a parcel of gas is a constant. Thus, if gas flow is allowed to accumulate in a fixed volume, the pressure of the entrapped gas will rise at a rate proportional to the flow rate. In the invention, the flow to be measured is caused to accumulate in a reservoir of known volume for a known time interval. The rise in pressure within the vessel is accurately and automatically measured by the sensor and converted to a flow measurement by the processing means, whose accuracy is dependent only upon conformity of the gas composing the measured flow to Boyle's law. Because of the well known universality of this physical law, the accuracy of the invention is thus independent of gas composition. In addition, extremely low back pressure is introduced into the gas flow path, which is significant in many applications. Further, the invention is relatively simple in construction and easy to install and maintain.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
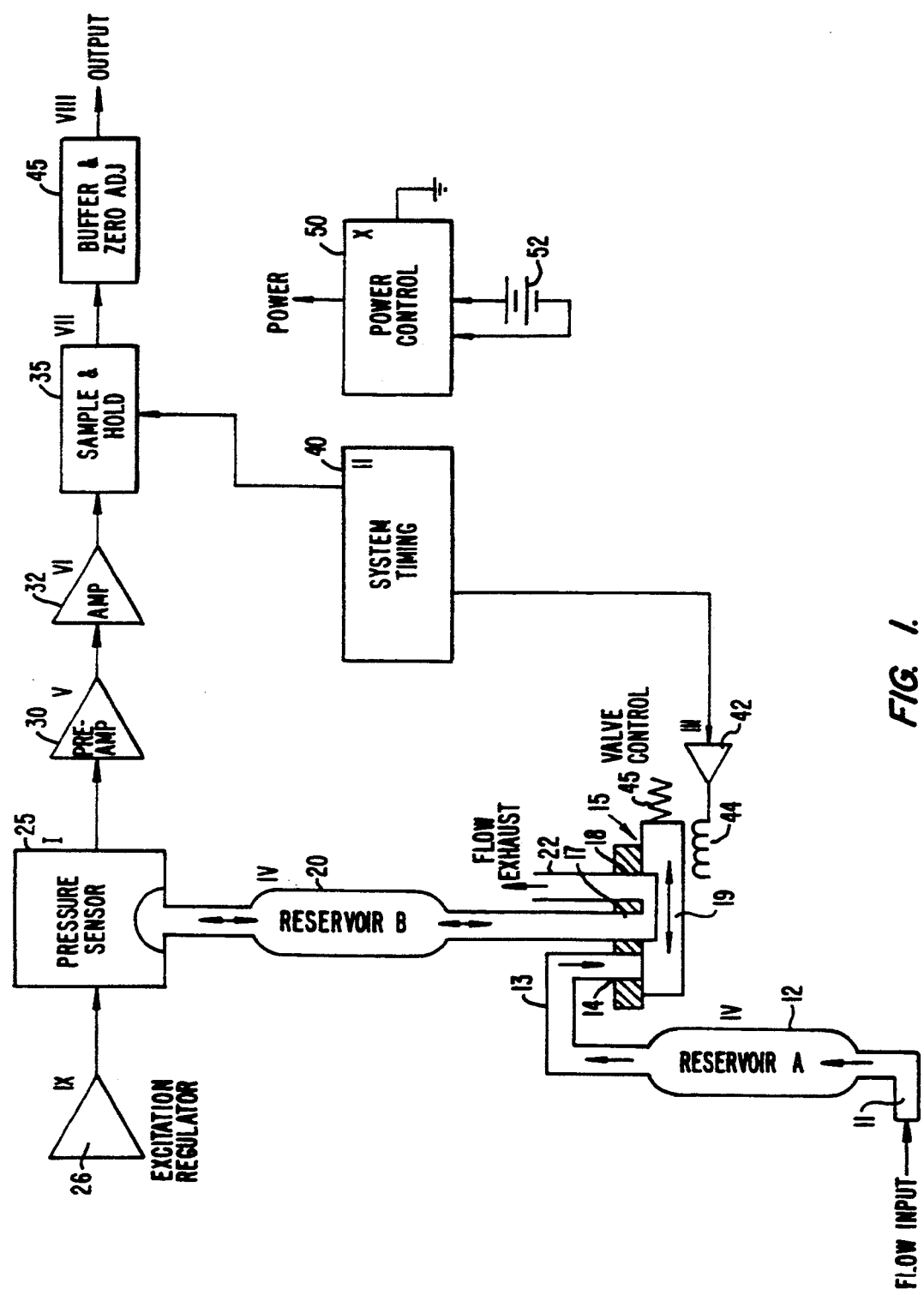
FIG. 1 is a schematic block diagram illustrating the preferred embodiment of the invention.

Turning now to the drawings, FIG. 1 is a schematic block diagram illustrating the major units comprising the preferred embodiment of the invention. As seen in this FIG., a flow inlet 11 is coupled to a first reservoir 12. The outlet end of reservoir 12 is coupled by a flow path conduit 13 to a first port 14 of a controllable valve 15. A second port 17 of valve 15 is coupled to the gas entrance of a second reservoir 20. A third port 18 of valve 15 is coupled to a flow outlet 22. Flow outlet 22 may be coupled to any suitable downstream device, such as a gas chromatograph.

Valve 15 includes a moveable element 19 which provides gas communication among the three ports 14, 17 and 18. In the actuated position illustrated in FIG. 1, when the valve is actuated by a suitable control signal described below, the reservoir 20 is placed in gas communication with the flow outlet 22 via central port 17, the moveable valve element 19 and outlet port 18. In the normal unactuated position (not illustrated), the moveable element 19 provides gas communication between inlet port 14 (and thus the flow inlet 11) and reservoir 20 via movable element 19 and central port 17, while blocking gas flow between the reservoir 20 and the outlet 22. Thus, in the normal or rest position gas flow is permitted from inlet 11 to reservoir 20 and gas flow from reservoir 20 to outlet 22 is blocked by moveable element 19.

Figure 2:
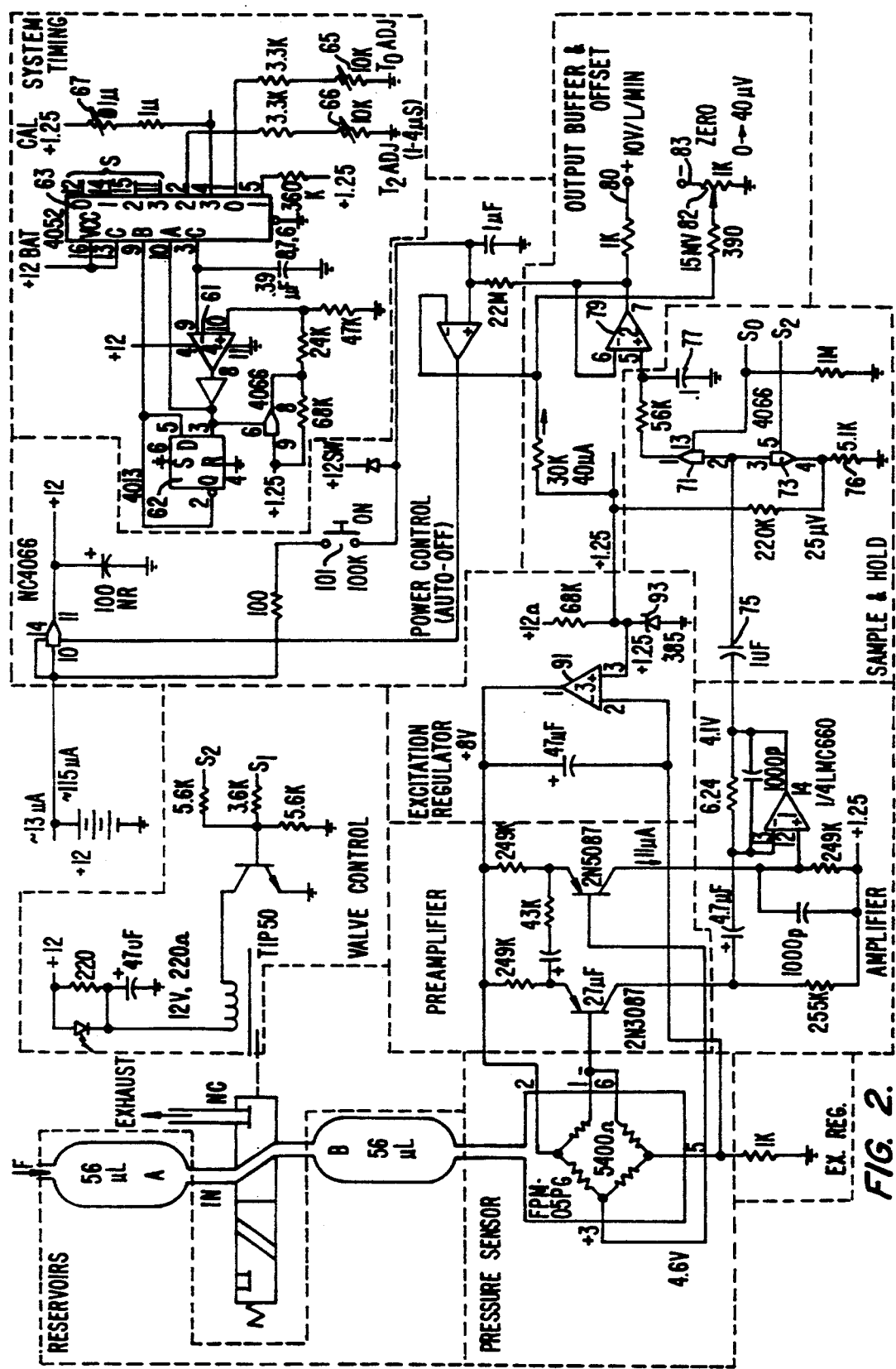
FIG. 2 is a detailed schematic of the embodiment of FIG. 1.

A pressure sensor 25 having an excitation regulator 26 is arranged to sense the pressure in reservoir 20. In the preferred embodiment, pressure sensor 25 comprises a Fujikura type Fpm-05PG pressure sensor capable of providing a differential voltage of approximately 17 mV/psig. Pressure sensor 25 is driven by the excitation regulator 26, the circuit for which is illustrated in FIG. 2 in detail.

The output of pressure sensor 25 is coupled to a preamplifier 30 for initial amplification of the electrical output signal from the sensor 25. Preamplifier 30 is a low-noise differential preamplifier comprising the 2N5087 transistors and associated discrete components shown in detail in FIG. 2. Preamplifier 30 is included in the preferred embodiment due to the extreme low amplitude of the electrical pressure signals produced by sensor 25 when measuring low flow rates. In the preferred embodiment, the desired resolution of 0.01 ml/min. corresponds to a minimum detectable signal of 340 nV. Since this is relatively close to the fundamental limits of circuit noise produced by the known Johnson processes, preamplifier 30 was deemed necessary. Preamplifier 30 provides a gain of approximately 24, which is more than adequate to increase the amplitude of the sensor 25 output signal above the noise threshold of a follow-on amplifier 32, which comprises an LMC660 FET amplifier configured in the manner illustrated in FIG. 2. Amplifier 32 provides an additional gain of approximately 24, which results in a net sensitivity of 5.71 volts/psi. In the preferred embodiment, both the preamplifier 30 and the amplifier 32 are AC coupled and therefore insensitive to DC offsets in the output signal generated by sensor 25. As a consequence, only pressure changes are amplified by elements 30 and 32.

The output of amplifier 32 is coupled to the sample input of a sample and hold unit 35. The timing of the sample acquisition is under control of a system timing unit 40, which also controls the operation of movable element 19 of valve 15 via a power amplifier 42 which drives a solenoid coil 44. It should be noted that valve 15 is normally biased to the opposite position from that illustrated in FIG. 1 by means of a biasing spring 45. Valve 15 is preferably a Clippard type ETO-3H solenoid operated valve available from Clippard Instrument Laboratory, Inc. 7390 Colerain Road, Cincinnati, Ohio.

The output of the sample and hold unit 35 is coupled to an output unit 45 which buffers and provides a zero reference level for the sample signals output from unit 35. The signals output from the unit 45 are coupled to the customary follow-on electronics, such as an analog meter, chart recorder, display or the like. A power control unit with optional auto shutoff 50 supplies power from a battery 52 to the various system components.

The system timing unit 40 comprises a variable period oscillator and decoder comprising the discrete elements illustrated in FIG. 2, which include an amplifier 61, a type 4013 flip flop 62 and a type 4052 multiplexer. Three variable resistances 65–67 control the duration of three of the four discrete phases of the four phase measurement cycle defined by four of the multiplexer 63 output terminals. Whenever one of the four phases is active, an enabling voltage of +12 volts DC appears on the corresponding output terminal. Thus, phase S0 is defined by a 12 volt active level on the output terminal S0, phase S1 is defined by a 12 volt output on terminal S1, etc. Terminal S0 is used to activate a gate 71 in the sample and hold unit 35. Terminal S1 is used to initially activate the power amplifier 42 in the valve control unit, and terminal S2 is used to maintain the valve 15 activated and to enable a gate 73 in sample and hold unit 35. In the preferred embodiment, the duration of the total measurement cycle is selected as 0.4 sec., with the, individual phases having a sequence and duration, respectively of 296 ms (S3), 2 ms (S2), 98 ms (S1) and 2 ms (S0).

Operation of the invention is based upon the principle of Boyle's law of gases which states that at invariant temperature the product of pressure and volume of a parcel of gas is a constant. Thus, if gas flow is allowed to accumulate in a fixed volume, the pressure of the entrapped gas will rise at a rate proportional to the flow rate.

In the flow meter according to the invention, the flow to be measured is caused to accumulate in reservoir 20 of known volume (56 ml) for a known time interval. The pressure rise (which is relatively small compared to the pressure in the gas path in order to avoid substantial back pressure from developing) is accurately and automatically measured by the pressure sensor 25 and follow-on electronic units and converted to a flow measurement whose accuracy is dependent only upon conformity of the gas composing the measured flow to Boyle's law. Because of the well known universality of this physical law, the accuracy of the flow meter is thus independent of gas composition.

Flow measure proceeds in a four phase cycle which totals about 0.4 sec. During phase 1 (indicated by state S3 of the system timing unit 40), valve 15 is in the de-energized state (the alternate state from that illustrated in FIG. 1 ). In this state, the exhaust port 18 is closed and the inlet port 14 is in gas communication with central port 17, which permits the gas flowing into the inlet path 11 to pass through reservoir 12, gas path section 13, inlet port 14, central port 17 and into reservoir 20. During this phase, the pressure in reservoir 20 rises to a maximum value. In response to applied pressure, pressure sensor 25 generates a differential voltage of approximately 17 mV/psig. Variations in this signal, which correspond to changes in pressure in reservoir 20, are amplified by low-noise differential preamplifier 30. The amplified signals output from preamplifier 30 are in turn amplified by amplifier 32 and presented to the sample input of sample and hold unit 35. During phase 2 (indicated by state S2 of the system timing unit 40), valve 15 is energized by the application of the S2 signal from system timing unit 40 to the base of the power transistor within amplifier 42. Since the valve 15 has a finite actuation delay of 5 ms, no mechanical motion occurs at this point. However, during the period of maximum pressure within reservoir 20, an analog switch 73 (see FIG. 2) in sample and hold unit 35 is closed connecting the right handplate of a sample and hold capacitor 75 to the upper terminal of a resistor 76. This action serves to capture the maximum pressure reference signal.

After the 5 ms actuation delay, during phase 3 (indicated by state S1 of the system timing unit 40) valve 15 achieves the activated state illustrated in FIG. 1 in which reservoir 20 is gas coupled to the flow outlet 22 via valve ports 17 and 18, and in which valve inlet port 14 is closed thereby blocking the inlet path to reservoir 20. During this phase, reservoir 12 serves as an accumulator to limit the amount of pressure rise in the inlet line (and thus the back pressure experienced by the gas source). In addition, as the pressure drops in reservoir 20 a corresponding signal change is generated by pressure sensor 25. This signal change is amplified by preamplifier 30 and amplifier 32, which causes a positive voltage excursion of the right hand plate of sample and hold capacitor 75. The ultimate magnitude of this excursion is directly related to the gas flow rate in the following way.

At equilibrium, the gas vented during this phase must be all the gas accumulated during the previous 400 ms cycle (since the gas has no other outlet). That quantity of gas is therefore the product of the flow rate F times the length of the measurement (0.00667 min.). The change in pressure in reservoir 20 produced by the venting during phase 3 of the cycle is therefore (by Boyle's law) given by the following expression:

$Dp = 0.00667 F/V$ (in atmospheres/ml/min.) $= 0.00175 F$ (psi/ml/min.)

where Dp is the pressure change and V = the volume of reservoir 20.

The pressure/voltage gain of pressure sensor 25 and amplifiers 30, 32 is selected to produce an excursion of 5.71 volts/psi. Consequently:

$$Dv=5.71Dp=5.71\times 0.00175F=0.01F/\text{volts/ml/min.})$$

During the last phase of the measurement cycle (indicated by state S0 of the system timing unit 40), which has a duration of 2 ms, valve 15 is deenergized. Due to the mechanical delay, immediate closure of the valve 15 to the unactivated opposite state from that depicted in FIG. 1 is prevented. The minimum pressure in reservoir 20 at this point produces the peak positive excursion of the signal produced by the sample and hold capacitor 75. This value is sampled via analog switch 71, which is closed by the S0 signal, and the sampled value is momentarily stored on an output hold capacitor 77. The voltage on capacitor 77 is buffered by a unity gain amplifier 79 and applied to the positive output terminal 80 as the final flow signal.

Zero offset adjustment of the final flow signal is provided by a potentiometer 82 connected to the negative output terminal 83. Exact calibration of the flow/voltage scale factor is accomplished by adjustment of the potentiometer 67, which is used to adjust the duration of phase 1 of the cycle and, thus, the duration of the gas accumulation in reservoir 20. Potentiometers 65 and 66 are used to provide fine adjustment of the duration of phase 2 and phase 4 of the total measurement cycle.

Excitation regulator unit 26 provides accurately regulated current required by the sensor 25 in order to sense the response of this unit to changes in pressure in reservoir 20. Sensor 25 operates on the principle of allowing the pressure to be sensed to impinge upon a silicon diaphragm, and the resulting strain is sensed by the piezo resistive strain gauge bridge shown in FIG. 2. Excitation regulator unit 26 includes an amplifier 91, a type LM385 diode 93 which provides a voltage reference, and the discrete components illustrated in FIG. 2, which together regulate a pressure sensor excitation current of 1.25 mA. Voltage reference diode 93 also is used to support the zero offset function afforded by potentiometer 82 and serves to provide stability for the system timing unit 40.

The optional auto-off circuit shown in FIG. 2 provides an automatic power management function for applying power to the sensor 25 upon actuation of a push button switch. Power is automatically removed when at least 2 min. have elapsed since the last actuation of switch 101, and the indicated flow is less than 1.5 ml per min.

Flow meters constructed according to the teachings of the invention provide a relatively higher accuracy than the inexpensive soap film type of flow meter and are relatively simple and clean to install and operate. Further, the system is capable of fully automatic operation, which can be a substantial disadvantage to the soap film type of flow meter in many applications. In addition, the invention provides a flow meter with a relatively wide dynamic range of flow measurement, is one which is insensitive to variation in gas stream composition (so long as the gas obeys Boyle's law), and one which imposes very low back pressure loadings on the gas flow source. Flow meters constructed according to the invention can be especially useful in the measurement of carrier gas flow in the chemical analysis technique of gas chromatography.

Figure 3A:
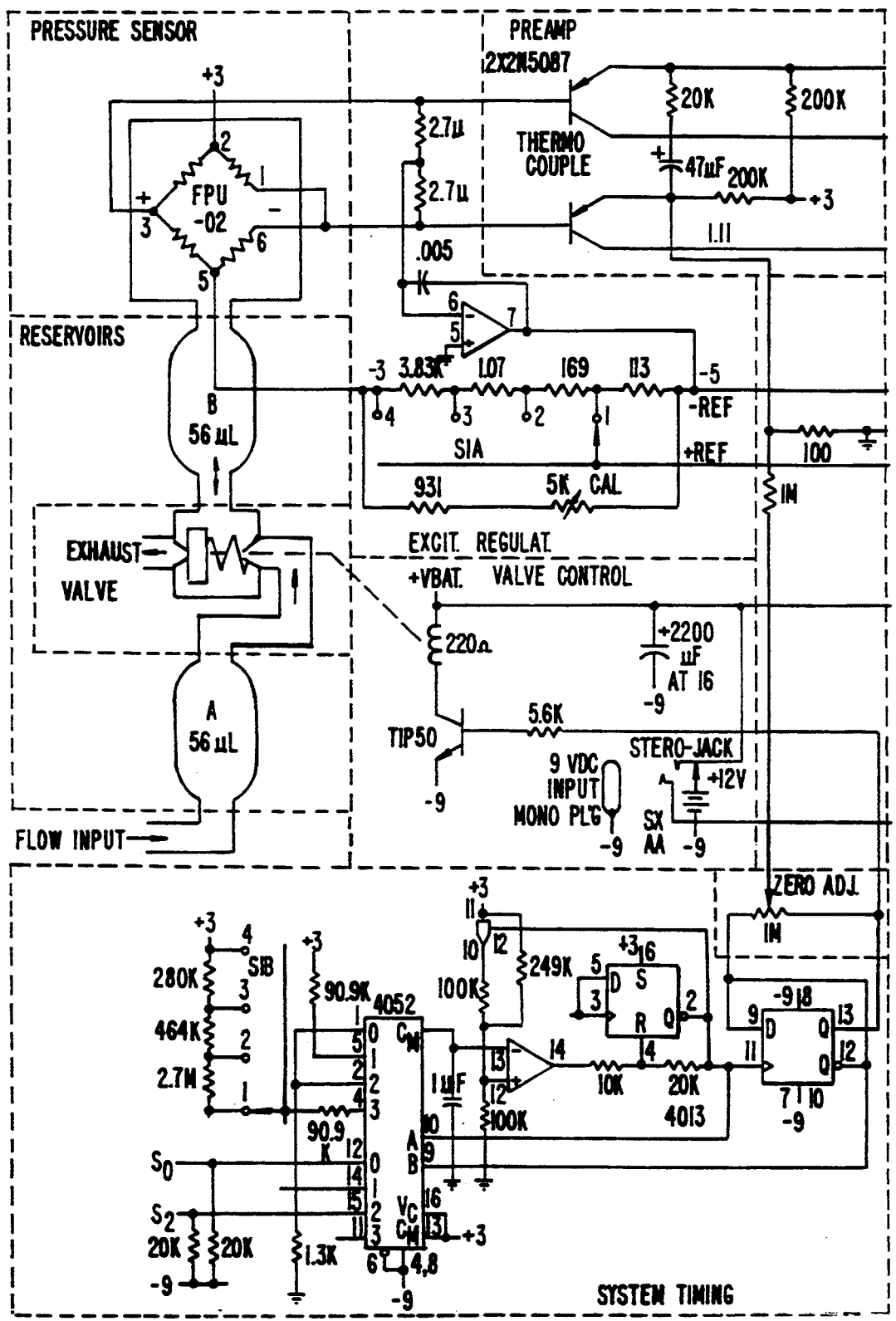
FIG. 3 shows the proper alignment of FIGS. 3a and 3b which are a detailed schematic of an alternate embodiment of the invention.
Figures 3, 3B:
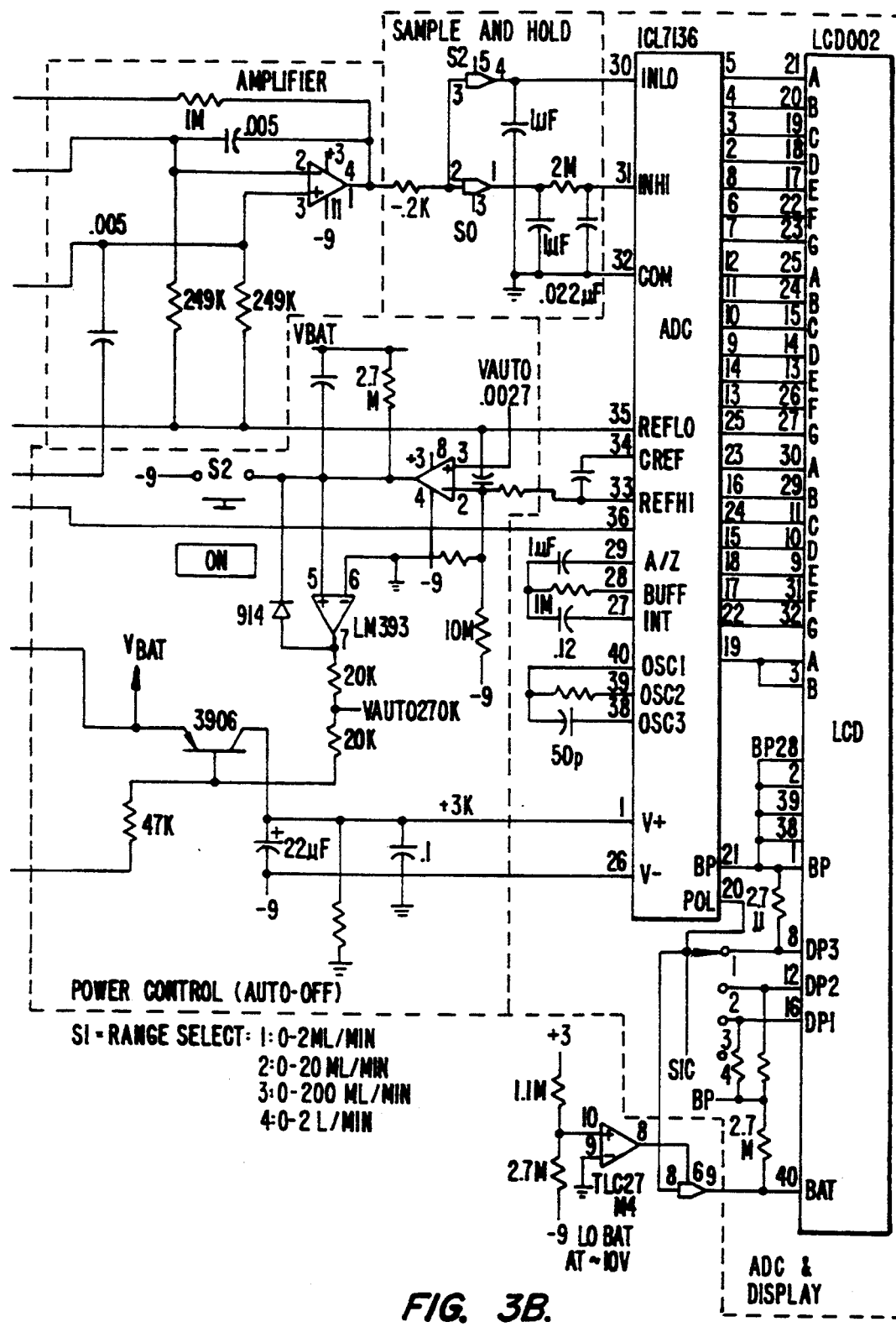

An alternate embodiment of the invention having an analog to digital converter and LCD display is illustrated in logic circuit form in FIG. 3.

While the above provides a full and complete disclosure of the preferred embodiments of the invention, various modifications, alternate constructions and equivalents may be employed without departing from the spirit and scope of the invention. For example, while specific circuit elements have been described above, other specific elements may be employed, depending on the requirements of a particular application. In addition, other sensors and valves may be found suitable for particular applications. Therefore, the above description and illustrations should not be construed as limiting the scope of the invention which is defined by the appended claims.

What is claimed is:

1. A method of determining the flow rate of a gas along a path having an inlet and an outlet, said method comprising the steps of:
    (a) directing the gas from the inlet through an accumulator volume into an enclosed volume until the gas pressure in the enclosed volume reaches a first value;
    (b) blocking the flow of gas from the inlet to the enclosed volume and relieving the gas pressure from the enclosed volume through the outlet until the gas pressure in the enclosed volume reaches a second value;
    (c) generating a signal representative of the change in gas pressure in the enclosed volume between the first and the second values; and
    (d) determining the gas flow rate from the signal generated in step (c).

2. The method of claim 1 wherein said step (a) of directing is preceded by the step of providing a controllable valve in the path between the inlet and the outlet.

3. The method of claim 2 wherein said step (a) of directing includes the steps of operating the valve to provide a temporary flow path from the inlet to the enclosed volume and blocking the flow path from the enclosed volume to the outlet.

4. The method of claim 2 wherein said step (b) of blocking includes the step of operating the valve to provide a temporary flow path from the enclosed volume to the outlet and blocking the flow path from the inlet to the enclosed volume.

5. The method of claim 1 wherein said step (c) of generating includes the steps of generating a signal representative of the gas pressure in the enclosed volume and sampling the maximum and minimum values of the signal.

6. The method of claim 1 wherein said step (d) of determining includes the step of applying the signal generated in step (c) to a display device.

7. A flow meter for determining the flow rate of a gas along a path having an inlet and an outlet, said flow meter comprising:
    an enclosed volume having a gas entrance;
    a sensor in communication with the gas pressure within said volume for generating an output signal representative of said gas pressure;
    valve means coupled to said enclosed volume for enabling gas communication between the gas path inlet and said gas entrance when the valve means is in a first position and between said gas path entrance and the gas path outlet when the valve means is in a second position;

accumulator means coupled to said valve means and the gas path inlet for limiting the pressure rise between the gas path inlet and said gas entrance when said valve means is in the second position.

processing means coupled to said sensor for converting the sensor signal to a gas flow rate signal; and control means coupled to said valve means and said processing means for enabling said valve means to alternately couple the gas path inlet to said gas entrance and said gas entrance to the gas path outlet over a fixed measurement cycle so that said enclosed volume is alternately filled to a first pressure and relieved to a second pressure, said control means enabling said processing means to generate said gas flow rate signal from the sensor signals representative of the first and second gas pressure values during the measurement cycle.

8. The invention of claim 7 wherein said valve means includes an inlet port coupled to the gas inlet, an outlet port coupled to the gas outlet, and a common port coupled to said gas entrance; and a controllable valve element for alternately coupling said inlet port to said common port and said outlet port to said common port.

9. The invention of claim 8 wherein said controllable element of said valve means is electrically operable.

10. The invention of claim 7 wherein said processing means includes an sample and hold circuit having a signal input coupled to said sensor, a signal output for manifesting said gas flow rate signal, and a control input coupled to said control means.

11. The invention of claim 7 wherein said control means includes a timing circuit for specifying a four phase measurement cycle.

12. The invention of claim 11 wherein said timing circuit includes a first output terminal for manifesting a control timing signal for said valve means and a second output terminal for manifesting a control timing signal for said processing means.

13. The invention of claim 7 wherein said processing means generates said gas flow rate signal in accordance with the equation:

$$F = Vb \times dP \times Fc$$

where Vb is the magnitude of the enclosed volume, dP is the difference between the maximum and the minimum gas pressure values and Fc is the frequency of the measurement cycle.

14. An apparatus for enabling measurement of the flow of gas along a path from an inlet to an outlet, said apparatus comprising:

a gas path having an inlet and an outlet;

a first reservoir having a gas entrance;

a valve mechanism having a gas inlet port, a gas outlet port, a common port coupled to said gas entrance, and a controllable element for providing gas coupling between said gas inlet port and said common port when in a first position and between said common port and said gas outlet port when in a second position;

means for coupling said gas inlet to said gas inlet port;

means for coupling said gas outlet port to said gas outlet;

control means coupled to said controllable element for generating a control signal to place said controllable element in said first position for a predetermined period of time and in said second position for a predetermined period of time during a gas flow measurement cycle, said first predetermined period of time being sufficient to enable said enclosed volume to be filled to a first pressure when said controllable element is in said first position and said second predetermined time interval being sufficiently long to enable said enclosed volume to evacuate to a second pressure when said controllable element is in said second position; and pressure sensor means in communication with said enclosed volume for generating a signal representative of the gas pessure therewithin.

15. The invention of claim 14 further including an accumulator volume positioned between said gas inlet and said gas inlet port for limiting the pressure rise when said controllable valve element is in said second position.

16. The invention of claim 14 further including processing means for converting said pressure sensor signal to a gas flow rate signal.

17. The invention of claim 16 further including display means coupled to said processing means for displaying the magnitude of the gas flow rate.

18. A flow meter for determining the flow rate of a gas along a path having an inlet and an outlet, said flow meter comprising:

an enclosed volume having a gas entrance;

a sensor in communication with the gas pressure within said volume for generating an output signal representative of said gas pressure;

valve means for enabling gas communication between the gas path inlet and said gas entrance when the valve means is in a first position and between said gas path entrance and the gas path outlet when the valve means is in a second position, said valve means including an inlet port coupled to the gas inlet, an outlet port coupled to the gas outlet, a common port coupled to said gas entrance, and a controllable valve element for alternately coupling said inlet port to said common port and said outlet port to said common port;

processing means coupled to said sensor for converting the sensor signal to a gas flow rate signal; and control means coupled to said valve means and said processing means for enabling said valve means to alternately couple the gas path inlet to said gas entrance and said gas entrance to the gas path outlet over a fixed measurement cycle so that said enclosed volume is alternately filled to a first pressure and evacuated to a second pressure, said control means enabling said processing means to generate said gas flow rate signal from the sensor signals representative of the first and second gas pressure values during the measurement cycle.

19. The invention of claim 18 wherein said controllable element of said valve means is electrically operable.

* * * * *